United States Patent
Guo et al.

(10) Patent No.: US 11,687,779 B2
(45) Date of Patent: Jun. 27, 2023

(54) IMAGE RECOGNITION METHOD AND APPARATUS, DEVICE, AND COMPUTER STORAGE MEDIUM

(71) Applicant: Beijing Baidu Netcom Science and Technology Co., Ltd., Beijing (CN)

(72) Inventors: Zhizhi Guo, Beijing (CN); Yipeng Sun, Beijing (CN); Jingtuo Liu, Beijing (CN); Junyu Han, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 303 days.

(21) Appl. No.: 17/208,611

(22) Filed: Mar. 22, 2021

(65) Prior Publication Data

US 2021/0209344 A1 Jul. 8, 2021

(30) Foreign Application Priority Data

Jun. 29, 2020 (CN) .......................... 202010605404.9

(51) Int. Cl.
*G06N 3/08* (2023.01)
*G06N 3/04* (2023.01)
(Continued)

(52) U.S. Cl.
CPC ............... *G06N 3/08* (2013.01); *G06F 18/10* (2023.01); *G06F 18/253* (2023.01); *G06N 3/04* (2013.01);
(Continued)

(58) Field of Classification Search
CPC .......... G06N 3/08; G06N 3/04; G06V 10/806; G06V 40/171; G06V 40/172; G06V 10/52; G06F 18/253; G06F 18/10
See application file for complete search history.

(56) References Cited

U.S. PATENT DOCUMENTS

2021/0327058 A1* 10/2021 Hu ............................ G06T 3/60

FOREIGN PATENT DOCUMENTS

CN 111199171 A 5/2020
JP 2009003842 A 1/2009
(Continued)

OTHER PUBLICATIONS

Saha Sumit: "A Comprehensive Guide to Convolutional Neural Networks—the ELI5 way / by Sumit Saha / Towards Data Science", Dec. 15, 2018 (Dec. 15, 2018), XP093005628, Retrieved from the Internet: URL:https://towardsdatascience.com/a-comprehensive-guide-to-convolutional-neural-networks-the-eli5-way-3bd2b1164a53.
(Continued)

*Primary Examiner* — David Perlman
(74) *Attorney, Agent, or Firm* — Husch Blackwell LLP

(57) ABSTRACT

An image recognition method is provided, which is related to a technical field of artificial intelligence, and in particular, to a technical field of image processing. An implementation includes: performing five-sense-organ recognition on a preprocessed human face image and marking positions of the human facial five sense organs in the human face image, to obtain the marked human face image; determining human face images at multiple scales of the marked human face image, inputting the human face images of multiple scales into a backbone network model, and performing feature extraction, to obtain a wrinkle feature of the human face image at each of the multiple scales; and fusing the wrinkle feature at each scale that is located in a same area of the human face image, to obtain a wrinkle recognition result of the human face image.

15 Claims, 6 Drawing Sheets

(51) Int. Cl.
G06V 40/16 (2022.01)
G06F 18/10 (2023.01)
G06F 18/25 (2023.01)
G06V 10/80 (2022.01)
G06V 10/52 (2022.01)

(52) U.S. Cl.
CPC ............ *G06V 10/52* (2022.01); *G06V 10/806* (2022.01); *G06V 40/171* (2022.01); *G06V 40/172* (2022.01)

(56) References Cited

FOREIGN PATENT DOCUMENTS

| | | | |
|---|---|---|---|
| JP | 2012243206 A | 12/2012 | |
| JP | 2014149677 A | 8/2014 | |
| JP | 2014164573 A | 9/2014 | |
| JP | 2018005434 A | 1/2018 | |

OTHER PUBLICATIONS

Ng Choon-Ching et al: "Will Wrinkle Estimate the Face Age?", 2015 IEEE International Conference on Systems, Man, and Cybernetics, IEEE, Oct. 9, 2015 (Oct. 9, 2015), pp. 2418-2423, XP032847509, DOI: 10.1109/SMC.2015.423.

Ng Choon-Ching et al: "Hybrid Ageing Patterns for face age estimation", Image and Vision Computing, Elsevier, Guildford, GB, vol. 69, Sep. 6, 2017 (Sep. 6, 2017), pp. 92-102, XP085413065, ISSN: 0262-8856, DOI: 10.1016/J.IMAVIS.2017.08.005.

Choon Ching Ng: "Face Age estimation using wrinkle patterns", Jan. 1, 2015 (Jan. 1, 2015), XP055569949, Retrieved from the Internet: URL:https://e-space.mmu.ac.uk/595499/1/Choon-Ching%20Ng%20-%20PhD%20Thesis%202015.pdf.

Shin Il-Kyu et al: "Extraction and Transfer of Facial Expression Wrinkles for Facial Performance Enhancement", Pacific Graphics (2014), Oct. 10, 2014 (Oct. 10, 2014), XP055837670, Retrieved from the Internet: URL:https://cgl.ethz.ch/Downloads/Publications/Papers/2014/Ozt14a/Ozt14a.pdf.

Ng Choon-Ching et al: "Wrinkle Detection Using Hessian Line Tracking", IEEE Access, vol. 3, Jul. 28, 2015 (Jul. 28, 2015), pp. 1079-1088, XP011664465, DOI: 10.1109/ACCESS.2015.2455871.

Choon-Ching Ng et al: "Automatic Wrinkle Detection Using Hybrid Hessian Filter" In: "Lecture Notes in Computer Science", Jan. 1, 2015 (Jan. 1, 2015), Springer Berlin Heidelberg, Berlin, Heidelberg, XP055207995, ISSN: 0302-9743, ISBN: 978-3-54-045234-8, vol. 9005, pp. 609-622, DOI: 10.1007/978-3-319-16811-1_40.

* cited by examiner

IMAGE RECOGNITION METHOD AND APPARATUS, DEVICE, AND COMPUTER STORAGE MEDIUM

CROSS-REFERENCE TO RELATED APPLICATIONS

This application claims priority to Chinese patent application, No. 202010605404.9, entitled "Image Recognition Method and Apparatus, Device, and Computer Storage Medium", filed with the Chinese Patent Office on Jun. 29, 2020, which is hereby incorporated by reference in its entirety.

TECHNICAL FIELD

The present application relates to a field of computer technology, and in particular, to a technical field of image processing.

BACKGROUND

With the development of computer technology, image processing and image recognition technologies are becoming more and more intelligent. In the field of image recognition, human face recognition and human body recognition can be performed by means of artificial intelligence. Image processing technologies are also gradually applied in more and more fields, such as security check, access control, news, and healthcare.

In the healthcare field, image recognition technologies can be used to recognize wrinkles on a human face.

SUMMARY OF THE INVENTION

The present disclosure provides an image recognition method and apparatus, a device, and a storage medium.

According to an aspect of the present disclosure, there is provided an image recognition method, including:

performing five-sense-organ recognition on a preprocessed human face image and marking positions of the human facial five sense organs in the human face image, to obtain a marked human face image;

determining human face images at multiple scales of the marked human face image, inputting the human face images at multiple scales into a backbone network model, and performing feature extraction, to obtain a wrinkle feature of the human face image at each of the multiple scales; and fusing the wrinkle feature at each scale that is located in a same area of the human face image, to obtain a wrinkle recognition result of the human face image.

According to another aspect of the present disclosure, there is provided an image recognition apparatus, including:

a recognition module, configured to perform five-sense-organ recognition on a preprocessed human face image and mark positions of the human facial five sense organs in the human face image, to obtain a marked human face image;

a feature extraction module, configured to determine human face images at multiple scales of the marked human face image, input the human face images at multiple scales into a backbone network model, and perform feature extraction, to obtain a wrinkle feature of the human face image at each of the multiple scales; and a fusion module, configured to fuse the wrinkle feature at each scale that is located in a same area of the human face image, to obtain a wrinkle recognition result of the human face image.

According to another aspect of the present disclosure, there is provided an electronic device, including:

at least one processor; and
a memory communicatively connected to the at least one processor, wherein the memory stores instructions executable by the at least one processor, the instructions, when executed by the at least one processor, enable the at least one processor to perform the method provided in any embodiment of the present application.

According to another aspect of the present disclosure, there is provided non-transitory computer-readable storage medium for storing computer instructions, wherein the computer instructions, when executed by a computer, cause the computer to implement the method provided in any embodiment of the present application.

It should be understood that the content described in this section is not intended to identify key or important features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution and do not constitute a limitation to the present application, wherein.

DETAILED DESCRIPTION OF THE PREFERRED EMBODIMENTS

The exemplary embodiments of the present application are described below in combination with the accompanying drawings, including various details of the embodiments of the present application to facilitate understanding, which should be considered as exemplary only. Therefore, those of ordinarily skill in the art should realize that various changes and modifications can be made to the embodiments described herein without departing from the scope and spirit of the present application. Likewise, for clarity and conciseness, descriptions of well-known functions and structures are omitted in the following description.

It should be noted that the embodiments in the present application and the features in the embodiments may be combined with each other so long as there is no conflict.

Figure 1:
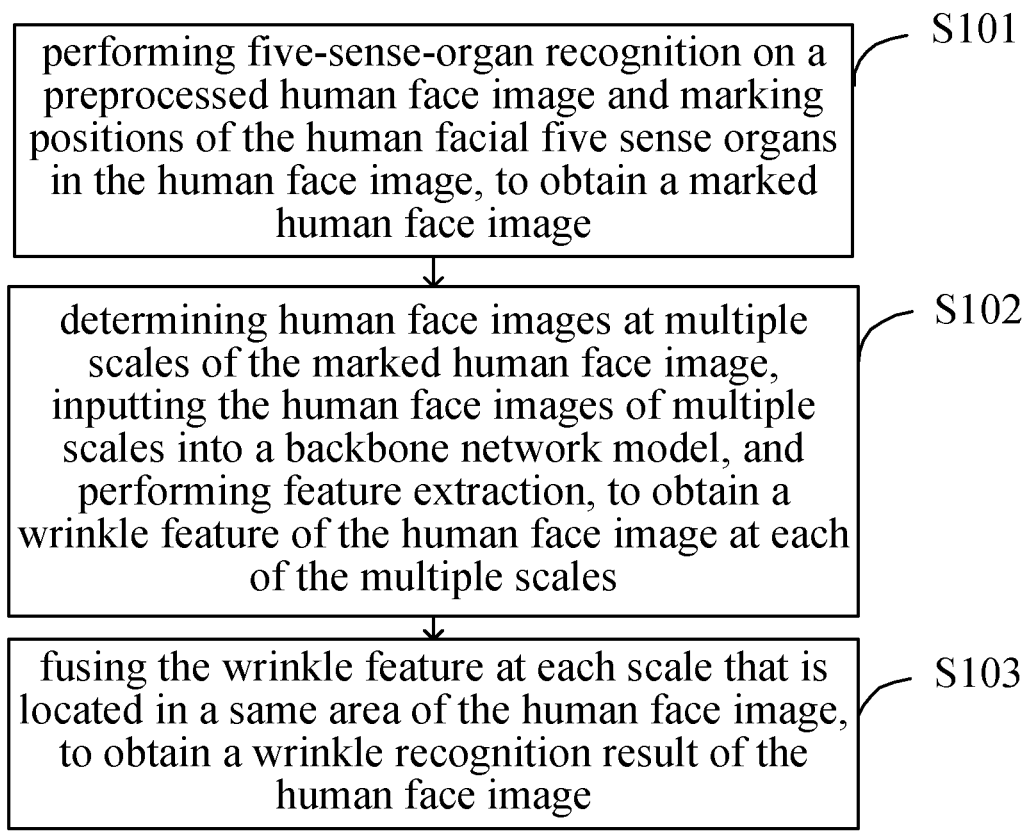
FIG. 1 is a schematic diagram of an image recognition method according to an embodiment of the present application.

FIG. 1 shows an image recognition method according to an embodiment of the present application, including:

S101: performing five-sense-organ recognition on a preprocessed human face image and marking positions of the human facial five sense organs in the human face image, to obtain a marked human face image;

S102: determining human face images at multiple scales of the marked human face image, inputting the human face images at multiple scales into a backbone network model, and performing feature extraction, to obtain a wrinkle feature of the human face image at each of the multiple scales; and S103: fusing the wrinkle feature at each scale that is located in a same area of the human face image, to obtain a wrinkle recognition result of the human face image.

In this embodiment, the preprocessed human face image may be a processed image of a human face image that needs to be processed, and specifically may be obtained by methods such as image planning, background culling, and human face detection. Performing organ recognition on the preprocessed human face image may include identifying areas where the five sense organs are located in the human face image, for example, identifying an eyeball area, a nose area, an eyebrow area, a cheek area, and a mouth area.

In this embodiment, the human face images at multiple scales may be human face images obtained by enlarging or reducing the human face image of the original size. For example, the human face image of the original size is reduced to a half, a quarter, or an eighth of the original size, to obtain a human face image of the original size, a human face image of a half of the original size, a human face image of a quarter of the original size or a human face image of an eighth of the original size.

In this embodiment, the human face images at multiple scales are input into a backbone network model and feature extraction is performed, to obtain a wrinkle feature of the human face image at each scale. For example, the human face image of the original size is reduced to a half, a quarter, or an eighth of the original size, to obtain a human face image of the original size, a human face image of a half of the original size, a human face image of a quarter of the original size and a human face image of an eighth of the original size. The correspondingly obtained wrinkle features at multiple scales include: a wrinkle feature of the original size, a wrinkle feature of a half of the original size, a wrinkle feature of a quarter of the original size and a wrinkle feature of an eighth of the original size.

In this embodiment, five-sense-organ recognition can be performed on a preprocessed human face image, then human face images at multiple scales can be obtained based on a result of the five-sense-organs recognition, and then the human face images at multiple scales can be input into a backbone network model and feature extraction can be performed, thereby to obtain a wrinkle feature of the human face image at each of the multiple scales. Since multiple scales are fused, it can be ensured that fine wrinkles are also recognized, and potentially hidden fine wrinkles can be segmented precisely, thereby improving recognition accuracy. In this embodiment, parameters are shared through the backbone network model, and contour coordinates of each wrinkle and the area of each wrinkle are output directly from an input end to an output end. In this embodiment, a network structure of multi-scale input and multi-scale output fusion is adopted, so that potentially hidden fine wrinkles can be segmented precisely, and human face wrinkles can be segmented precisely in different illumination environments.

Figure 2:
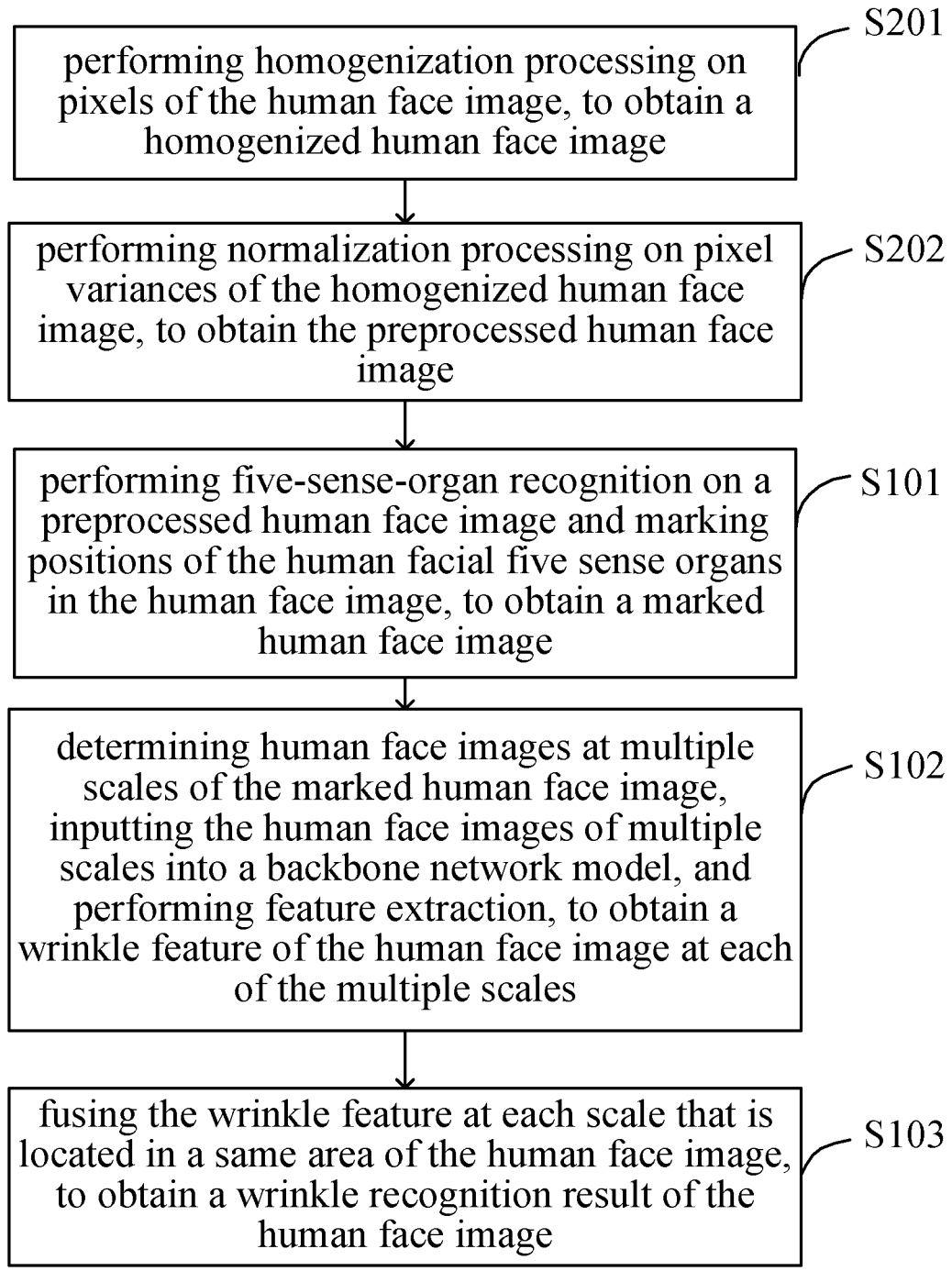
FIG. 2 is a schematic diagram of an image recognition method in a specific scenario according to an embodiment of the present application.

In one implementation, as shown in FIG. 2, the image recognition method further includes:

S201: performing homogenization processing on pixels of the human face image to obtain a homogenized human face image; and S202: performing normalization processing on pixel variances of the homogenized human face image to obtain the preprocessed human face image.

In this embodiment, the performing homogenization processing on pixels of the human face image to obtain a homogenized human face image may specifically include: performing homogenization processing on pixel values of the human face image. The pixels are adjusted in accordance with a set pixel value. If a pixel value is higher than the set pixel value, the corresponding pixel value will be adjusted downward; if the pixel value is lower than the set pixel value, the corresponding pixel value will be adjusted upward.

Figure 3:
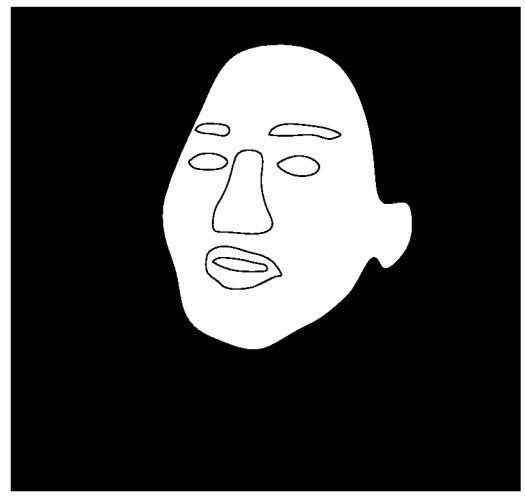
FIG. 3 is a schematic diagram of an image recognition method according to another embodiment of the present application.

In this embodiment, a skin detection area is obtained by using a human face detection model and a human face key-point detection model, and the mean and variances of the skin detection area are normalized to eliminate the influence of illumination in different environments. Areas of the human facial five sense organs and skin are segmented by using a human facial five-sense-organ segmentation model, to obtain a skin detection mask as shown in FIG. 3.

The wrinkle segmentation method is usually affected by factors such as illumination, skin shadow, and glasses, and segmentation accuracy is very low when image quality is poor. In this embodiment, human face pixels are subjected to homogenization processing, and then the pixel variances of the homogenized human face image are normalized, so as to be able to avoid a human face shadow that is caused by factors such as illumination and covering by glasses and would affect the accuracy of wrinkle recognition. In this embodiment, wrinkles of various types (forehead lines, crow's feet, fine lines under the eyes, nasolabial folds) on a human face are precisely segmented based on a depth learning model, which produces good accuracy and robustness for human face images in different illumination environments.

In another embodiment of the present application, the inputting the marked human face image into a backbone network model and performing feature extraction, to obtain wrinkle features of the human face image at different scales, includes:

performing multi-scale stretching and retraction processing on the marked human face image, to obtain human face images at multiple scales; and inputting the human face images at multiple scales into the backbone network model, to obtain a wrinkle feature of the human face image at each of the multiple scales.

In this embodiment, human face images at multiple scales may be obtained by subjecting the human face image to multi-scale stretching and retraction processing. In other embodiments, the human face image may be enlarged or reduced.

In this embodiment, inputting the human face images at multiple scales into the backbone network model to obtain a wrinkle feature of the human face image at each of the multiple scales may specifically include: inputting the human face images at multiple scales into a backbone network model and first performing fusion processing of the human face images at multiple scales and then separating the human face images at multiple scales, to obtain wrinkle features of the human face image at multiple scales.

In this embodiment, by imputing the human face images at multiple scales to the backbone network model and performing wrinkle feature extraction and analysis, the recognition rate of fine wrinkles can be improved.

In one implementation, the image recognition method further includes:

inputting the human face images at multiple scales into the backbone network model, to obtain a recognition result of areas of the human facial five sense organs.

In this embodiment, the process of recognition of areas of the five sense organs may be executed by using the backbone network model.

In this embodiment, by performing recognition of areas of the human facial five sense organs using the backbone network model, recognition of the five sense organs and recognition of wrinkles can be processed at the same time, which improves wrinkle recognition efficiency.

In one implementation, the fusing the wrinkle features at different scales that are located in a same area of the human face image, to obtain a wrinkle recognition result of the human face image, includes:

ignoring the wrinkle recognition result of the human face image in a case where a human face area corresponding to the wrinkle recognition result of the human face image is an area of the five sense organs that has no wrinkle.

In this embodiment, the area of five sense organs that has no wrinkle may include facial areas such as eyeballs that are obviously impossible to have wrinkles.

If a wrinkle is recognized in an area of the five sense organs that has no wrinkle, the recognition may be erroneous, and therefore the recognition result may be ignored.

An embodiment of the present application proposes an end-to-end image recognition method base on a depth learning model, for segmentation of wrinkles on a human face. The method extracts deep semantic features by using the depth learn model, and a segmentation contour of each wrinkle is output at a detection branch of the model. Because the areas of human facial wrinkles are fixed relatively to the positions of the human facial five sense organs, a branch of segmentation of the human facial five sense organs is introduced to perform supervised training, improving the accuracy of wrinkle segmentation. At the same time, the embodiment of the present application adopts a network structure with multi-scale input and multi-scale fusion output, in which semantic features in an original high-resolution image can be fully utilized and are fused with high-level semantic features of the image, and potentially hidden fine wrinkles can be segmented precisely.

Figure 4:
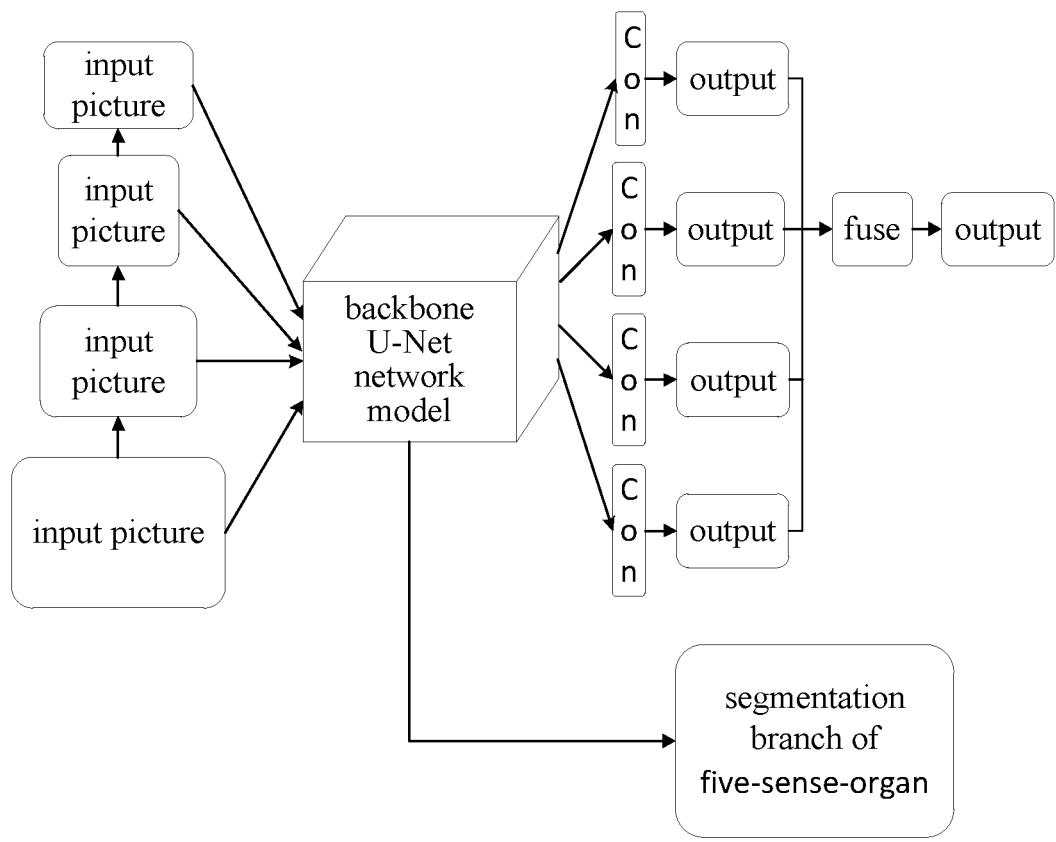
FIG. 4 is a schematic diagram of an image recognition data processing process according to another embodiment of the present application.

A model framework in an example of the present application is as shown in FIG. 4: after an input image is preprocessed, preprocessed images at different scales are fed into a backbone network model (i.e., the backbone U-Net network model in the figure), which provides shared convolution parameters, outputs semantic information features of different feature levels to a feature fusion layer, and fuses low-level semantic features and high-level semantic features. The fused features are fed into four detection branches at different scales, and the output results of the four detection branches are linearly weighted, to obtain a final segmentation result of human facial wrinkles. The output results may specifically be images, and the image output results at different scales can be weighted downward. In the training process, a five-sense-organ segmentation mask branch is introduced to perform supervised learning, so that the backbone network model learns more position information of the human facial five sense organs. The entire framework forms a unified model, which can be trained as a whole from an end to an end. In this example, convolution calculation is performed for the images of different scales in a convolutional layer of the backbone network model. The input images are spliced in a splicing channel, and then the spliced image is subjected to convolution calculation, and the spliced image after the convolution calculation is subjected to convolution separation, to finally obtain an output image.

In this embodiment, during the preprocessing of an image, a human face area is obtained by using a human face detection model and a human face key-point detection model, and the mean and variances of the human face area are normalized to eliminate the influence of illumination in different environments. A human facial five-sense-organ mask is segmented by using a human facial five-sense-organ segmentation model, and the five-sense-organ segmentation mask shares the parameters of the backbone network model as a branch task, so that the backbone network model learns more position-related useful information, so as to improve the accuracy of wrinkle segmentation. In the process of processing an input image, the backbone network model learns position-related useful information, an area that is unlikely to occur has a high weight, and the positions where a wrinkle appears are relatively fixed. Position information is acquired by a neural network through learning.

After the image is preprocessed, the image is stretched at multiple scales. Human facial wrinkles have an elongated shape, the width of deep wrinkles is usually smaller than five pixels, and there are many potentially hidden fine wrinkles, which are difficult to detect when image quality is poor. In order to ensure that fine wrinkles can also be detected, in this example, the human face image is converted into human face images at multiple scales, i.e., the original high-resolution image is scaled to different sizes, so that the backbone network model can learn more high-resolution features.

In this example, the basic network part of the backbone network includes, but is not limited to, ResNet-34, inception-v3, mobilenet-v2 (mobile network model v-2), and etc., and this part can use any image classification network structure as a basis. Human face images at different scales are input into the backbone network model, wrinkle features are output through a convolutional neural network (CNN) of the backbone network model, and then wrinkle features of multiple scales are added to a feature fusion part on the basic network structure, that is, features of multiple scales in the basic network are combined so as to obtain relative-scale-invariant multi-scale features. This part may adopt, but is not limited to, common feature combination methods such as UNet (U-shaped network) and FPN (Feature Pyramid Networks), so as to ensure simplicity, ease of use, and scalability of a backbone network base and multi-scale features.

In this example, detection branches are derived at four feature layers of different scales, each branch predicts respectively a wrinkle segmentation result, and wrinkle segmentation results at four different scales are linearly weighted, to obtain a final wrinkle segmentation result.

Figure 5:
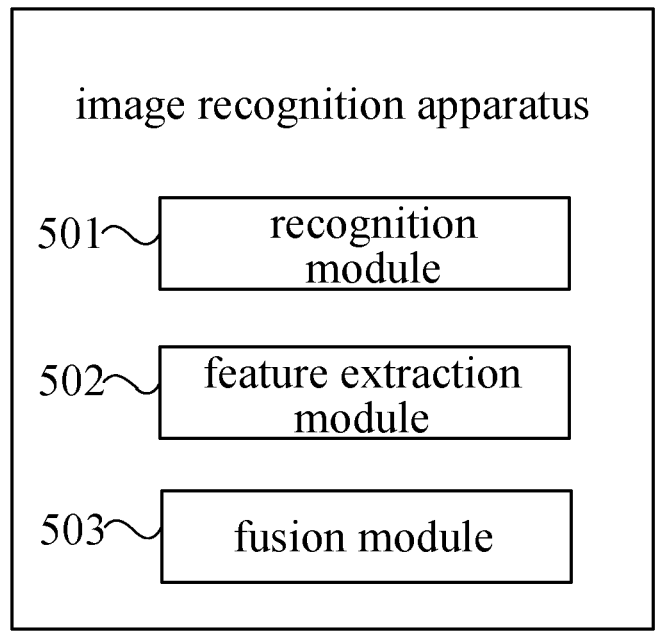
FIG. 5 is a schematic diagram of an image recognition apparatus according to an embodiment of the present application.

Another embodiment of the present application further provides an image recognition apparatus, as shown in FIG. 5, including:

a recognition module 501, configured to perform five-sense-organ recognition on a preprocessed human face image and mark positions of the human facial five sense organs in the human face image, to obtain a marked human face image;

a feature extraction module 502, configured to determine human face images at multiple scales of the marked human face image, input the human face images of multiple scales into a backbone network model, and perform feature extraction, to obtain a wrinkle feature of the human face image at each of the multiple scales; and a fusion module 503, configured to fuse the wrinkle feature at each scale that is located in a same area of the human face image, to obtain a wrinkle recognition result of the human face image.

Figure 6:
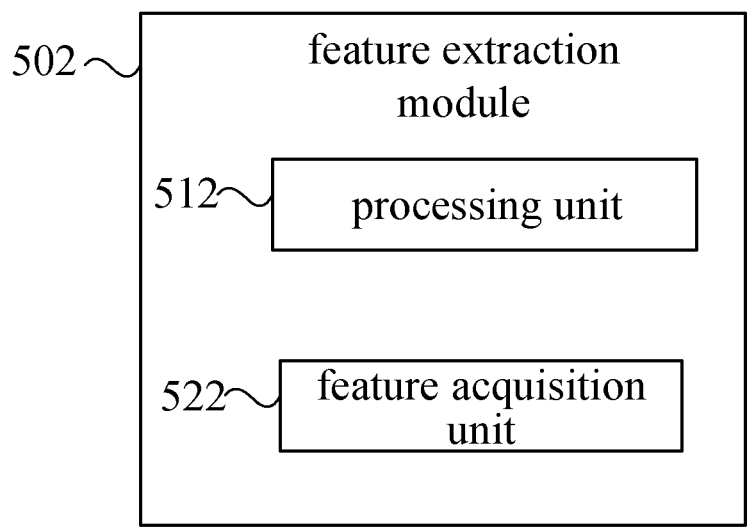
FIG. 6 is a schematic diagram of an image recognition apparatus according to another embodiment of the present application.

In another embodiment of the present application, an encoding apparatus further includes a first preprocessing module and a second preprocessing module as shown in FIG. 6:

a first preprocessing module 504, configured to perform homogenization processing on pixels of the human face image, to obtain a homogenized human face image; and a second preprocessing module 505, configured to perform normalization processing on pixel variances of the homogenized human face image, to obtain a preprocessed human face image.

Figure 7:
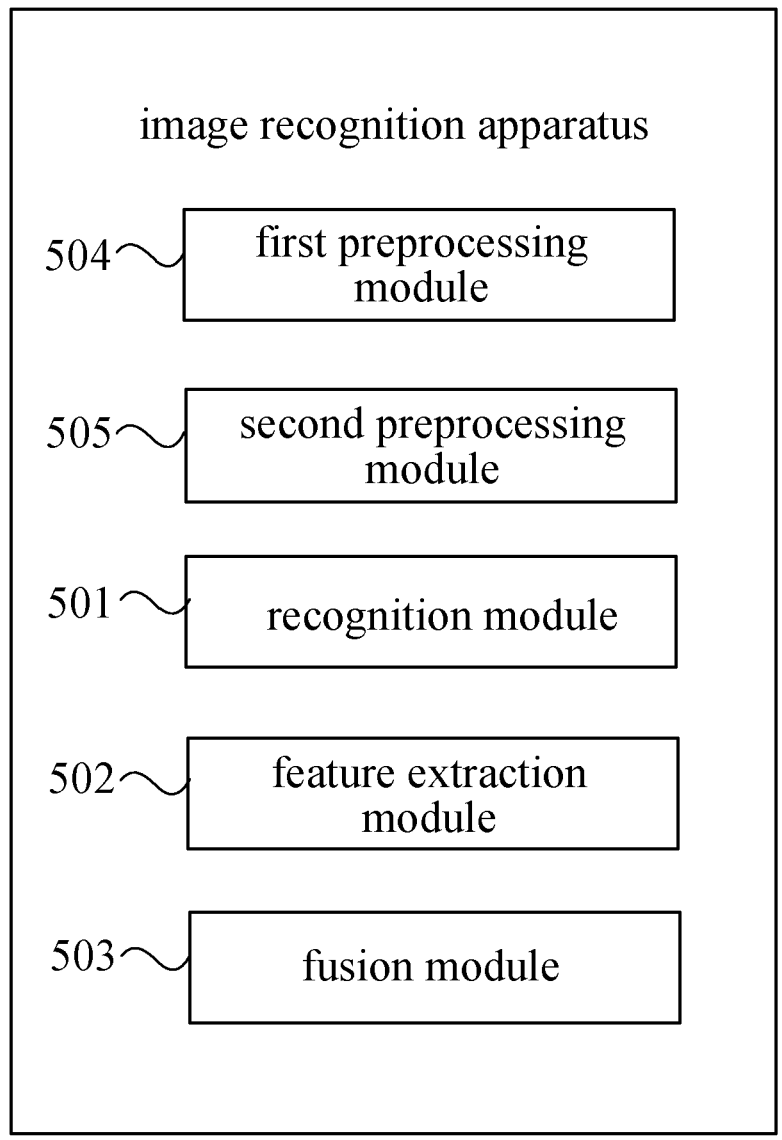
FIG. 7 is a schematic diagram of an apparatus of a feature extraction module in an image recognition apparatus according to an embodiment of the present application.

In another embodiment of the present application, as shown in FIG. 7, a feature extraction module of the encoding apparatus includes:

a processing unit 512, configured to perform multi-scale stretching and retraction processing on the marked human face image, to obtain the human face images of multiple scales; and a feature acquisition unit 522, configured to input the human face images of multiple scales into the backbone network model, to obtain a wrinkle feature of the human face image at each of the multiple scales.

According to embodiments of the present application, the present application further provides an electronic device and a readable storage medium.

Figure 8:
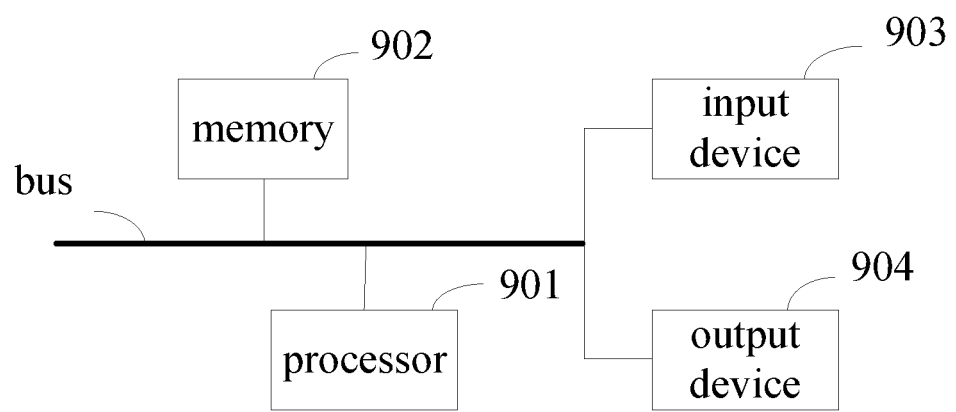
FIG. 8 is a block diagram of an electronic device used to implement an image recognition method according to an embodiment of the present application.

As shown in FIG. 8, it is a block diagram of an electronic device for an encoding method according to an embodiment of the present application. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 8, the electronic device includes: one or more processors 801, a memory 802, and interfaces for connecting various components, which include a high-speed interface and a low-speed interface. The various components are connected to each other using different buses, and may be installed on a common motherboard or installed in other ways as needed. The processor may process instructions executed within the electronic device, including instructions stored in or on the memory to display graphic information of GUI on an external input/output apparatus (such as a display apparatus coupled to an interface). In other embodiments, if necessary, multiple processors and/or multiple buses may be used with multiple memories. Similarly, multiple electronic devices may be connected, and each device provides a part of necessary operations (for example, as a server array, a group of blade servers, or a multi-processor system). One processor 801 is taken as an example in FIG. 8.

The memory 802 is the non-transitory computer-readable storage medium provided by the present application. Here, the memory stores instructions executable by at least one processor, so that the at least one processor performs the method provided by the present application. The non-transitory computer-readable storage medium of the present application stores computer instructions, which are used to cause the computer to execute the method provided by the present application.

As a non-transitory computer-readable storage medium, the memory 802 may be used to store non-transitory software programs, non-transitory computer executable programs and modules, such as program instructions/modules (for example, the recognition module 501, the feature extraction module 502, and the fusion module 503 shown in FIG. 5) corresponding to the method in the embodiment of the present application. The processor 801 executes various functional applications and data processing of the server by executing the non-transitory software programs, instructions and modules that are stored in the memory 802, that is, implements the method in the foregoing method embodiments.

The memory 802 may include a storage program area and a storage data area, wherein the storage program area may store an operating system and application programs required by at least one function; the storage data area may store the data created based on the use of a video encoding electronic device. Moreover, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories provided remotely with respect to the processor 801, and these remote memories may be connected to the video encoding electronic device via a network. Examples of the aforementioned network include, but are not limited to, the Internet, a corporate intranet, a local area network, a mobile communication network, and combinations thereof.

The electronic device for the encoding method may further include: an input apparatus 803 and an output apparatus 804. The processor 801, the memory 802, the input apparatus 803, and the output apparatus 804 may be connected through a bus or in other ways. In FIG. 8, connection through a bus is taken as an example.

The input apparatus 803, such as a touch screen, a keypad, a mouse, a trackpad, a touchpad, an indicating rod, one or more mouse buttons, a trackball, a joystick, etc., may receive input numeric or character information and generate key signal inputs related to user settings and function control of the video encoding electronic device. The output apparatus 804 may include a display device, an auxiliary lighting apparatus (for example, LED), a tactile feedback apparatus (for example, a vibration motor). The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may include: implementation in one or more computer programs, which may be executed and/or interpreted on a programmable system including at least one programmable processor, which may be an application specific or general-purpose programmable processor that may receive data and instructions from, and transmit data and instructions to, a storage system, at least one input apparatus, and at least one output apparatus.

These computation programs (also referred to as programs, software, software application, or codes) include machine instructions of programmable processors, and these computation programs can be implemented by using a high-level process and/or object-oriented programming language, and/or an assembly/machine language. As used herein, the terms "machine-readable medium" and "computer-readable medium" refer to any computer program product, device, and/or apparatus (for example, a magnetic disk, an optical disk, a memory, a programmable logic devices (PLD)) used to provide machine instructions and/or data to a programmable processor, including a machine-readable media that receives machine instructions as machine-readable signals. The term "machine-readable signal" refers to any signal used to provide machine instructions and/or data to a programmable processor.

In order to provide interactions with a user, the systems and technologies described herein may be implemented on a computer that has: a display device (for example, CRT (Cathode Ray Tube) or LCD (liquid crystal display) monitor) for displaying information to the user; and a keyboard and pointing device (for example, a mouse or a trackball) through which the user may provide input to the computer. Other types of apparatuses may also be used to provide interactions with a user; for example, the feedback provided to a user may be any form of sensory feedback (for example, visual feedback, auditory feedback, or tactile feedback); and the input from a user may be received in any form (including acoustic input, voice input, or tactile input).

The systems and technologies described herein may be implemented in a computing system (for example, as a data server) including back-end components, or a computing system (for example, an application server) including middleware components, or a computing system (for example, a user computer having a graphical user interface or a web browser through which the user may interact with the implementation of the systems and technologies described herein) including front-end components, or a computing system including any combination of such back-end components, middleware components or front-end components. The components of the system may be connected to each other by any form or medium of digital data communication (for example, a communication network). Examples of communication networks include: a Local Area Network (LAN), a Wide Area Network (WAN), and the Internet.

The computer system may include a client and a server. The client and the server are generally far away from each other and typically interact through a communication network. The client-server relationship is generated by computer programs that run on respective computers and have a client-server relationship with each other.

The technical solution of embodiments of the present application is able to obtain a wrinkle feature of a human face image at each of multiple scales by performing five-sense-organ recognition on a preprocessed human face image, to obtain human face images of multiple scales based on a result of the five-sense-organs recognition, and then inputting the human face images of multiple scales into a backbone network model and performing feature extraction. Since multiple scales are fused, it can be ensured that fine wrinkles are also recognized, and potentially hidden fine wrinkles can be segmented precisely, thereby improving recognition accuracy. In this embodiment, parameters are shared by the backbone network model, and contour coordinates of each wrinkle and the area of each wrinkle are output directly from an input end to an output end. In this embodiment, a network structure of multi-scale input and multi-scale output fusion is adopted, potentially hidden fine wrinkles can be segmented precisely, and human face wrinkles can be segmented precisely in different illumination environments.

It should be understood that various forms of processes shown above may be used to reorder, add, or delete steps. For example, respective steps described in the present application may be executed in parallel, or may be executed sequentially, or may be executed in a different order, as long as the desired result of the technical solution disclosed in the present application can be achieved, no limitation is made herein.

The foregoing specific embodiments do not constitute a limitation to the protection scope of the present application. Those skilled in the art should understand that various modifications, combinations, sub-combinations, and substitutions may be made according to design requirements and other factors. Any modification, equivalent replacement, or improvement made within the spirit and principle of the present application shall fall within the protection scope of the present application.

What is claimed is:

1. An image recognition method, comprising:
performing five-sense-organ recognition on a preprocessed human face image and marking positions of the human facial five sense organs in the human face image, to obtain a marked human face image;
determining human face images at multiple scales of the marked human face image, inputting the human face images of multiple scales into a backbone network model, and performing feature extraction, to obtain a wrinkle feature of the human face image at each of the multiple scales; and
fusing the wrinkle feature at each scale that is located in a same area of the human face image, to obtain a wrinkle recognition result of the human face image.

2. The method according to claim 1, further comprising:
performing homogenization processing on pixels of the human face image, to obtain a homogenized human face image; and
performing normalization processing on pixel variances of the homogenized human face image, to obtain the preprocessed human face image.

3. The method according to claim 1, wherein the inputting the marked human face image into a backbone network model and performing feature extraction, to obtain wrinkle features of the human face image at different scales, comprises:
performing multi-scale stretching and retraction processing on the marked human face image, to obtain the human face images of multiple scales; and
inputting the human face images of multiple scales into the backbone network model, to obtain a wrinkle feature of the human face image at each of the multiple scales.

4. The method according to claim 3, further comprising:
inputting the human face images of multiple scales into the backbone network model, to obtain a recognition result of areas of the human facial five sense organs.

5. The method according to claim 3, wherein the fusing the wrinkle features at different scales that are located in a same area of the human face image, to obtain a wrinkle recognition result of the human face image, comprises:

ignoring the wrinkle recognition result of the human face image in a case where a face area corresponding to the wrinkle recognition result of the human face image is an area of the five sense organs that has no wrinkle.

6. An image recognition apparatus, comprising:
at least one processor; and
a memory communicatively connected to the at least one processor, wherein
the memory stores instructions executable by the at least one processor, the instructions are executed by the at least one processor to enable the at least one processor to:
perform five-sense-organ recognition on a preprocessed human face image and mark positions of the human facial five sense organs in the human face image, to obtain a marked human face image;
determine human face images at different scales of the marked human face image, input the human face images of multiple scales into a backbone network model, and performing feature extraction, to obtain a wrinkle feature of the human face image at each of the multiple scales; and
fuse the wrinkle feature at each scale that is located in a same area of the human face image, to obtain a wrinkle recognition result of the human face image.

7. The apparatus according to claim 6, wherein the instructions are executed by the at least one processor to further enable the at least one processor to:
perform homogenization processing on pixels of the human face image, to obtain a homogenized human face image; and
perform normalization processing on pixel variances of the homogenized human face image, to obtain the preprocessed human face image.

8. The apparatus according to claim 6, wherein the instructions are executed by the at least one processor to further enable the at least one processor to:
perform multi-scale stretching and retraction processing on the marked human face image, to obtain the human face images of multiple scales; and
input the human face images of multiple scales into the backbone network model to obtain a wrinkle feature of the human face image at each of the multiple scales.

9. The apparatus according to claim 8, wherein the instructions are executed by the at least one processor to further enable the at least one processor to input the human face images of multiple scales into the backbone network model, to obtain a recognition result of areas of the human facial five sense organs.

10. The apparatus according to claim 8, wherein the instructions are executed by the at least one processor to further enable the at least one processor to ignore the wrinkle recognition result of the human face image in a case where a face area corresponding to the wrinkle recognition result of the human face image is an area of the five sense organs that has no wrinkle.

11. A non-transitory computer-readable storage medium for storing computer instructions, wherein the computer instructions, when executed by a computer, cause the computer to:
perform five-sense-organ recognition on a preprocessed human face image and mark positions of the human facial five sense organs in the human face image, to obtain a marked human face image;
determine human face images at multiple scales of the marked human face image, input the human face images of multiple scales into a backbone network model, and perform feature extraction, to obtain a wrinkle feature of the human face image at each of the multiple scales; and
fuse the wrinkle feature at each scale that is located in a same area of the human face image, to obtain a wrinkle recognition result of the human face image.

12. The non-transitory computer-readable storage medium according to claim 11, wherein the computer instructions, when executed by a computer, further cause the computer to:
perform homogenization processing on pixels of the human face image, to obtain a homogenized human face image; and
perform normalization processing on pixel variances of the homogenized human face image, to obtain the preprocessed human face image.

13. The non-transitory computer-readable storage medium according to claim 11, wherein the computer instructions, when executed by a computer, further cause the computer to:
perform multi-scale stretching and retraction processing on the marked human face image, to obtain the human face images of multiple scales; and
input the human face images of multiple scales into the backbone network model, to obtain a wrinkle feature of the human face image at each of the multiple scales.

14. The non-transitory computer-readable storage medium according to claim 13, wherein the computer instructions, when executed by a computer, further cause the computer to:
input the human face images of multiple scales into the backbone network model, to obtain a recognition result of areas of the human facial five sense organs.

15. The non-transitory computer-readable storage medium according to claim 13, wherein the computer instructions, when executed by a computer, further cause the computer to:
ignore the wrinkle recognition result of the human face image in a case where a face area corresponding to the wrinkle recognition result of the human face image is an area of the five sense organs that has no wrinkle.

* * * * *